(12) United States Patent
Zimmerman et al.

(10) Patent No.: US 10,914,674 B2
(45) Date of Patent: Feb. 9, 2021

(54) MONITORING AND CONTROL SYSTEMS

(71) Applicant: Percev LLC, Davenport, IA (US)

(72) Inventors: Andrew T. Zimmerman, Colorado Springs, CO (US); Jerome Lynch, Ann Arbor, MI (US); Mohammed M. Ettouney, West New York, NJ (US); Sharada Alampalli, Loudonville, NY (US)

(73) Assignee: Percev LLC, Davenport, IA (US)

( * ) Notice: Subject to any disclaimer, the term of this patent is extended or adjusted under 35 U.S.C. 154(b) by 310 days.

(21) Appl. No.: 15/970,261

(22) Filed: May 3, 2018

(65) Prior Publication Data

US 2018/0321135 A1  Nov. 8, 2018

Related U.S. Application Data

(60) Provisional application No. 62/500,654, filed on May 3, 2017.

(51) Int. Cl.
| | | |
|---|---|---|
| G01N 19/08 | (2006.01) | |
| G01N 3/02 | (2006.01) | |
| G01N 5/00 | (2006.01) | |
| G01N 3/08 | (2006.01) | |
| G01M 5/00 | (2006.01) | |

(52) U.S. Cl.
CPC .............. *G01N 19/08* (2013.01); *G01M 5/00* (2013.01); *G01N 3/02* (2013.01); *G01N 3/08* (2013.01)

(58) Field of Classification Search
CPC .............................. G01M 5/0008; G05B 1/00
See application file for complete search history.

(56) References Cited

U.S. PATENT DOCUMENTS

| | | | |
|---|---|---|---|
| 3,234,777 A | 2/1966 | Joy | |
| 4,956,999 A | 9/1990 | Bohannan et al. | |
| 5,676,514 A * | 10/1997 | Higman | ................. B61B 13/04 |
| | | | 198/349 |
| 6,012,337 A | 1/2000 | Hodge | |
| 6,181,841 B1 | 1/2001 | Hodge | |
| 6,240,783 B1 | 6/2001 | McGugin et al. | |
| 6,487,914 B1 | 12/2002 | Hodge | |
| 7,668,692 B2 | 2/2010 | Tatom et al. | |
| 8,209,134 B2 | 6/2012 | Parker et al. | |
| 8,384,538 B2 | 2/2013 | Breed | |
| 9,354,043 B2 | 5/2016 | Parker et al. | |

(Continued)

*Primary Examiner* — Matthew G Marini
(74) *Attorney, Agent, or Firm* — Black, McCuskey, Souers & Arbaugh LPA

(57) ABSTRACT

A monitoring and control system includes a stationary body with a sensor, a moving body with a sensor, and at least one computing device. The stationary body is positioned along a path of movement. The moving body moves along the path and physically interacts with the stationary body. The at least one computing device receives signals from the sensor on the stationary body and from the sensor on the moving body. The at least one computing device determines a performance value of the stationary or moving body based on the physical interaction between the moving and stationary bodies. The performance value is dependent on both of the signals received from the sensor associated with the stationary body and received from the sensor associated with the moving body as the moving body interacts with the stationary body.

14 Claims, 6 Drawing Sheets

(56) References Cited

U.S. PATENT DOCUMENTS

| | | |
|---|---|---|
| 9,488,545 B2 | 11/2016 | Rice et al. |
| 2010/0094566 A1 | 4/2010 | Grant et al. |
| 2010/0231919 A1 | 9/2010 | Schereiber et al. |
| 2010/0238027 A1 | 9/2010 | Bastianini |
| 2011/0029276 A1 | 2/2011 | Martin |
| 2015/0226633 A1 | 8/2015 | Greimann et al. |
| 2018/0264614 A1* | 9/2018 | Winkelmann ...... G01M 13/045 |

* cited by examiner

MONITORING AND CONTROL SYSTEMS

CROSS-REFERENCE TO RELATED APPLICATIONS

This application claims the benefit of U.S. Provisional Patent Application Ser. No. 62/500,654 for MONITORING SYSTEMS, filed on May 3, 2017, which is hereby incorporated by reference in its entirety.

BACKGROUND

1. Field

The present disclosure relates to subject matter wherein the measurement system or process is applicable in the science concerning motion or action of force on a body, or the design, construction, operation, and care of mechanical process or structure, or for a solution of a problem in these areas.

2. Description of Related Prior Art

U.S. Pat. No. 9,488,545 discloses a HIGH SENSITIVITY ENVIRONMENTAL SENSOR NETWORK AND NETWORK SERVICES FOR STRUCTURAL HEALTH MONITORING. The high sensitivity structural health monitoring network includes a plurality of sensor nodes disposed apart from each other and communicating through one or more sensor channels. The nodes include smart sensor circuit boards with an interface to a wireless smart sensor board platform, a multi-axis accelerometer having a measurement range and resolution set to provide sensitivity to measure ambient structural vibrations an analog to digital converter for converting signals that includes a plurality of individual channels being individually programmable for signal conditioning for providing data to the interface. A network framework provides network services including a time synchronization service with network-wide global timestamps for sensor data and a unified sensing service that supports collection of data for all sensor channels from all nodes together with a single set of associated time stamps.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A monitoring and control system includes a stationary body, at least one sensor associated with the stationary body, a moving body, at least one sensor associated with the moving body, and at least one computing device. The stationary body is positioned along a path of movement. The at least one sensor associated with the stationary body is configured to emit signals corresponding to a condition of the stationary body. The moving body moves along the path of movement and physically interacts with the stationary body during movement along the path of movement. The at least one sensor associated with the moving body is configured to emit signals corresponding to a condition of the moving body. The at least one computing device has one or more processors and is configured to receive signals from the at least one sensor associated with the stationary body and to receive signals from the at least one sensor associated with the moving body. The at least one computing device is also configured to determine a performance value of at least one of the stationary body and the moving body based on the physical interaction between the moving and stationary bodies as the moving body traverses the stationary body during travel along the path of movement. The performance value is dependent on both of the signals received from the at least one sensor associated with the stationary body and the signals received from the at least one sensor associated with the moving body during the period that the moving body physically interacts with the stationary body.

BRIEF DESCRIPTION OF THE DRAWINGS

The detailed description set forth below references the following drawings.

DETAILED DESCRIPTION

Figure 1:
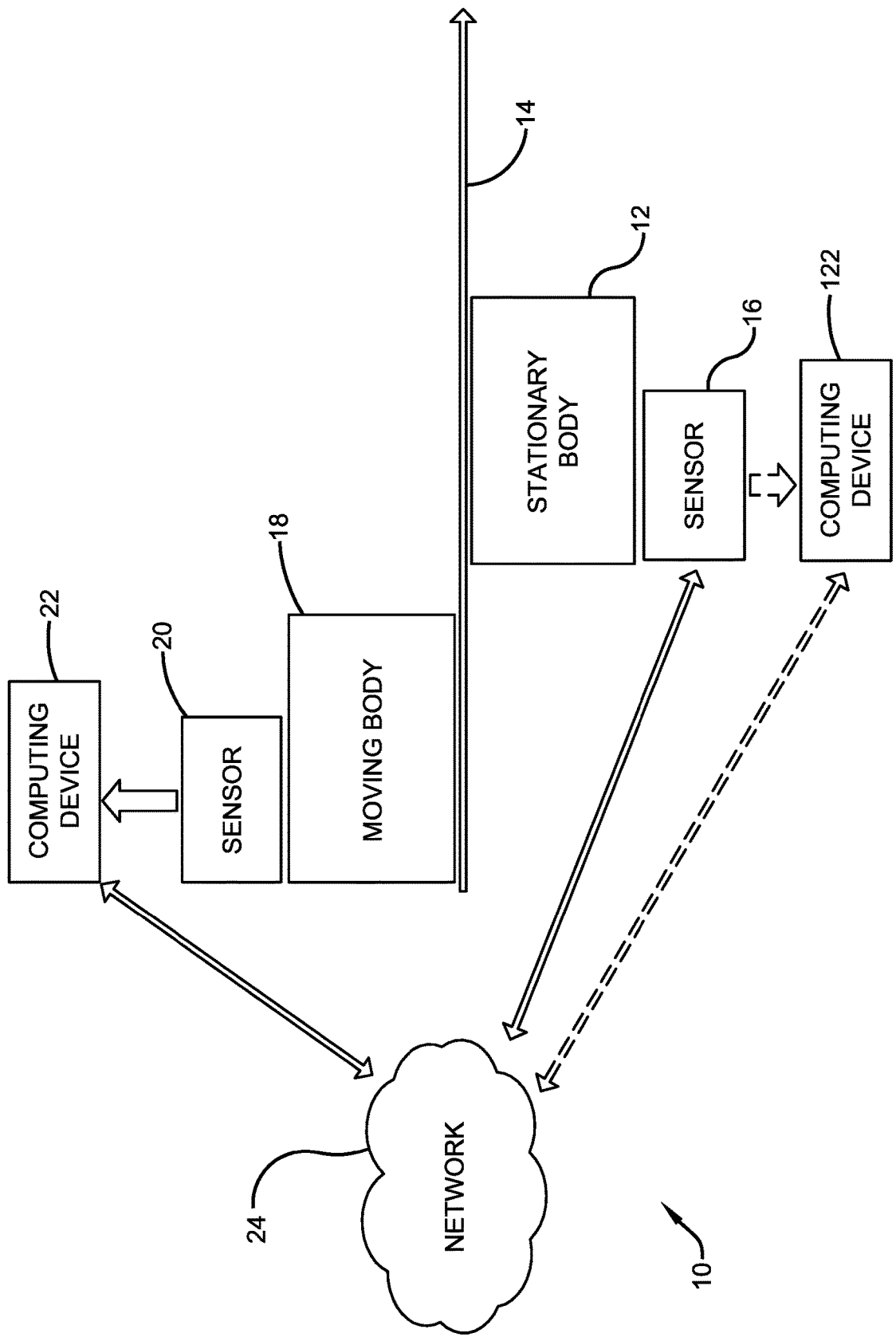
FIG. 1 is a first schematic illustration of an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 2:
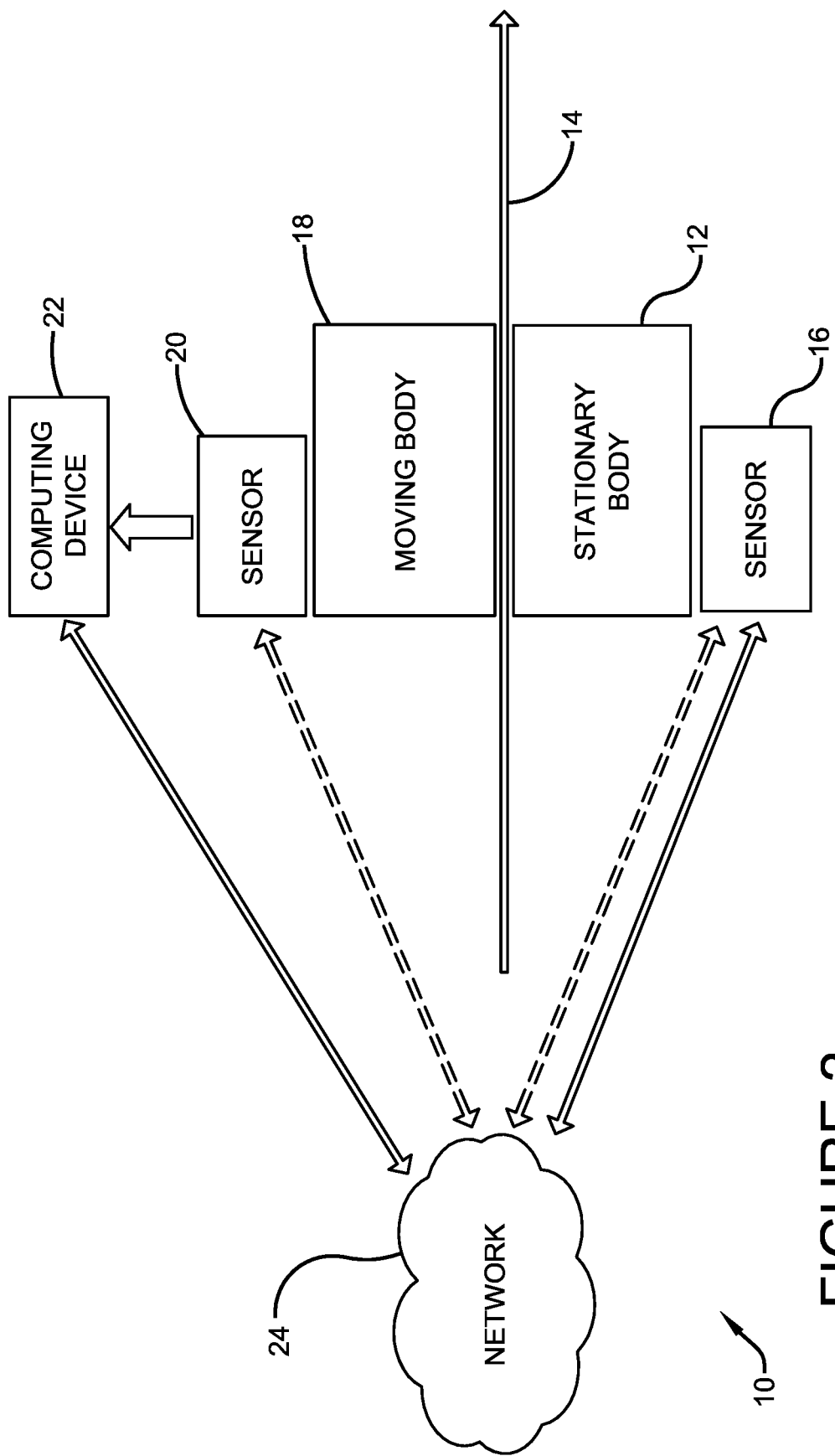
FIG. 2 is a second schematic illustration of the exemplary embodiment of the present disclosure.
Figure 3:
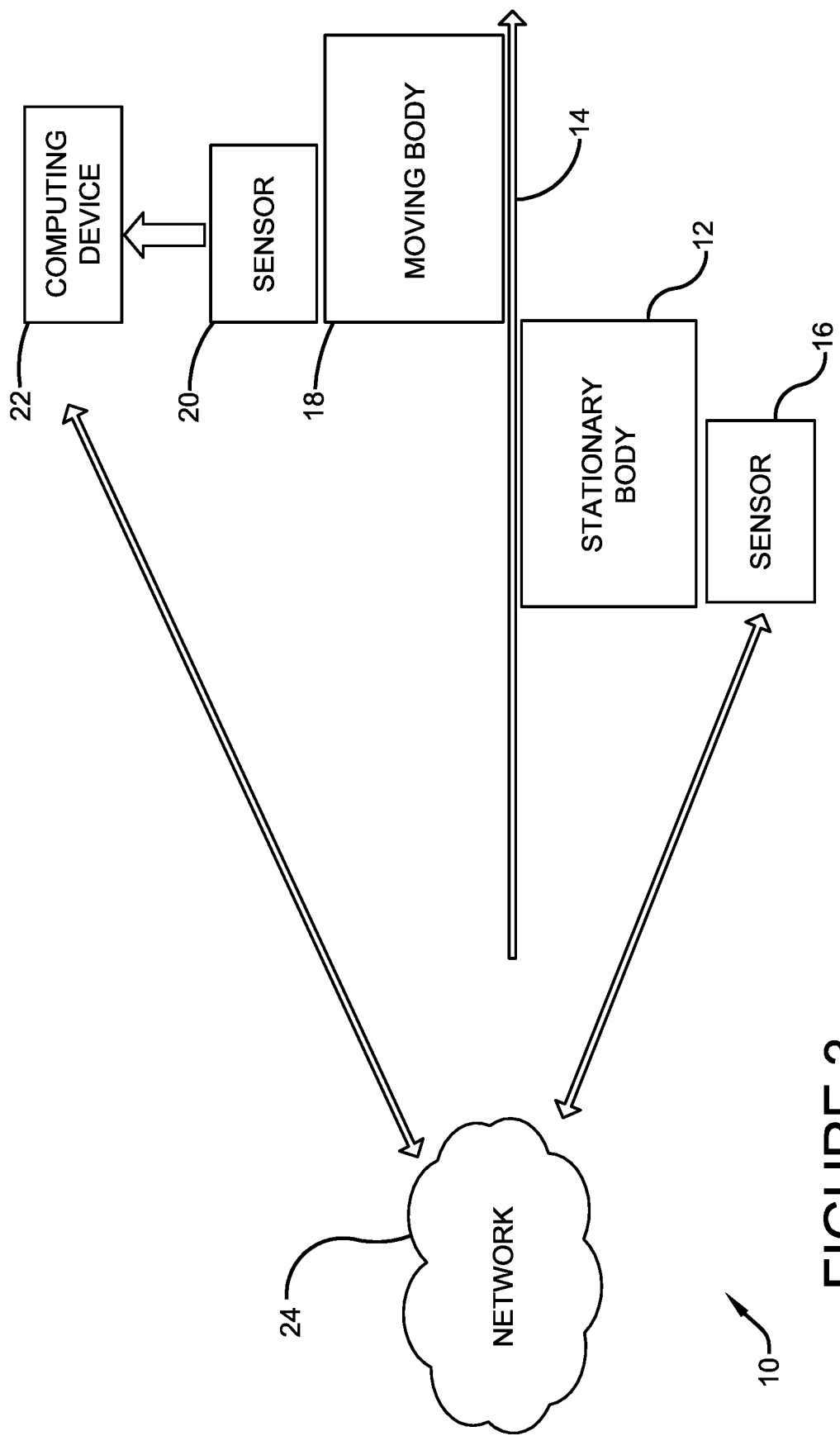
FIG. 3 is a third schematic illustration of the exemplary embodiment of the present disclosure.

The present disclosure, as demonstrated by the exemplary embodiments described below, can provide a monitoring and control system. FIGS. 1-3 are illustrations of an exemplary embodiment of the present disclosure. A monitoring and control system 10 includes a stationary body 12 that can be positioned along a path 14 of movement. At least one sensor 16 measuring static or dynamic measurands can be associated with the stationary body 12 and can be configured to emit signals corresponding to a condition of the stationary body 12. A moving body 18 can interact with the stationary body 12 during movement along the path 14 of movement. The interaction can involve direct, physical contact and the path of movement may be either linear or non-linear. At least one sensor 20 measuring static or dynamic measurands can be associated with the moving body 18 and can be configured to emit signals corresponding to a condition of the moving body 18.

At least one computing device 22 of the monitoring and control system 10, having one or more processors, can be configured to receive signals from the at least one sensor 16 associated with the stationary body 12 and to receive signals from the at least one sensor 20 associated with the moving body 18. The at least one computing device 22 can receive signals from the sensors 16, 20 over a network 24. The network 24 can be a wireless network. The at least one computing device 22 can be configured to determine a performance value of at least one of the stationary body 12 and the moving body 18 based on the physical interaction between the moving and stationary bodies 12, 18 as the moving body 18 traverses the stationary body 12 during travel along the path 14 of movement. The performance value is dependent on both of the outputs of the at least one sensor 16 associated with the stationary body 12 and the at least one sensor 20 associated with the moving body 18 during the period that the moving body 18 traverses the stationary body 12.

The exemplary at least one computing device 22 is disclosed in FIGS. 1-3 as physically separate and remote from the body 12 and mounted on the body 18. The exemplary at least one computing device 22 is collocated (onboard) the physical structure of the body 18 with the sensor 20. The at least one computing device 22 can be collocated with either the at least one sensor 16, the at least one sensor 20, or can stand alone. A second computing device 122 is shown in FIG. 1, in phantom. The second computing device 122 can be utilized in place of the at least one computing device 22 or in conjunction with the at least one computing device 22. One or both of the computing devices 22, 122 can generate the network 24 in one or more embodiments of the present disclosure. It is also noted that, in one or more embodiments of the present disclosure, the sensors can communicate directly with one another. A direction communication line between the sensors 16, 20 is shown in phantom in FIG. 2.

It is noted that a moving sensor may beacon its existence to the stationary sensor or sensors. Upon receipt of a beacon, the stationary sensor or sensors will establish a communication link and incorporate that moving sensor into the original stationary sensor network topology. Time synchronization could be performed between the sensors based on the beacon signal or using established time synchronization protocols. It is further noted that, in one or more implementations of the present disclosure, sensors mounted on the stationary body could be registered to a topology of sensors mounted on the moving body.

In an embodiment of the present invention, the stationary body is a railroad bridge and the moving body is a train, moving along railroad tracks that cross said railroad bridge. Many rail systems around the world are both extensive and old. In the United States, for example, the rail system comprises 223,000 km of rail with 77,000 bridges, more than half of which are more than one hundred years old. Studies performed by the Khanna Committee, in India, reported that seventy-six percent of all rail accidents are due to derailments, with poor bridge structural health being a contributor to derailments.

The loss of life caused by trains is staggering—every year, tens of thousands of people die in railway accidents. These statistics, as sobering as they are, do not include the revenue lost due to accidents nor do they capture the potential damage caused by a train derailment. Trains are used to transport extremely hazardous cargo, such as fuel, radioactive materials, and toxic chemicals. Thus, a derailment could release these materials into the environment leading to major public health disasters. Further, the failure of certain bridges can disrupt the rail network for extended periods of time, greatly increasing the time and cost to move goods and people from one place to another. Further, it is likely that the losses due to railroad accidents will continue to mount as rail usage is increasing rapidly while the core infrastructure continues to age.

Current railroad bridge management programs rely mostly on visual inspections, with bridges inspected on an annual or multi-annual basis. Performing these inspections properly is challenging given the complexity and age of the bridges and the need for highly trained personnel to perform the inspections. Post-inspection analyses are performed to assess the load carrying capacity of the inspected bridge using field observations and condition ratings for each bridge span. Unfortunately, these inspection methods are fundamentally qualitative and are known to introduce subjectivity to the evaluation process. The cost, in the US, for performing these inspections is highly dependent on the bridge, but for even the simplest of bridges is on the order of US $10,000 per inspection.

Saving money and lives means ensuring the health and safety of railroad bridges in order to reduce the risks of catastrophic events such as derailment and/or bridge failure. A system that provides rail managers with predictions of safety issues, damage, and failures allows them to efficiently deploy limited resources while minimizing the risk of structural damage, system failures and service interruptions. Some of the benefits of such a system include: maintenance strategies based on monitored performance rather than a fixed-schedule can better protect valuable infrastructure via superior prioritization, while eliminating costs associated with unnecessary maintenance; detection of rail loads in the network using bridge monitoring system as a weigh-in-motion system (WIMS) or wheel impact load detector (WILD) that allows railroads to validate manifest data (weight per car) while quantitatively assessing imposed loads on rail infrastructure; and monitoring-based load ratings can allow for larger loads and/or higher speeds (while still staying under appropriate safety thresholds). Larger loads and higher speeds create extra capacity for freight, which can be multiplied by the cost of that freight in order to show net gained revenue for a railroad.

The present invention provides such a system. The railroad bridge may be outfitted with a suite of sensors, possibly including one or more of strain gauge, accelerometer, displacement sensor, anemometer, and thermometer. These exemplary sensors are examples and embodiments of the present disclosure could include more or less than five sensors. On their own, such a suite of sensors can provide information about the structural behavior and integrity of the bridge in an unloaded state. For example, should some object strike the bridge, perhaps a ship or vehicle passing underneath it, the suite of sensors could detect the impact and how the bridge reacts to said impact. Further analyses could potentially indicate if the impact may have caused the bridge to respond beyond a defined limit state, have residual deformation and/or be damaged. However, without being able to load the bridge, i.e., without having a load that approximates that of a train crossing the bridge, this set of sensors may not always predict how the bridge will respond when being loaded. Without being able to make such predictions, the railway operator will not be able to realize all of the benefits noted.

The bridge or the rail network in close proximity to the bridge may also be outfitted with wheel impact load detectors (WILD) which measure the axle weights of trains travelling in a rail network. While WILD stations provide static (i.e., not dynamic) axle loads, they would not provide any information on how trains interact and dynamically couple with bridges. Without being able to fully understand the dynamic amplification of the static axle loads introduced by a train on the bridge, the railway operator will not be able to realize all of the benefits noted.

The train may be outfitted with a suite of sensors, including one or more of a Global Positioning System (GPS), current clamp, thermometer, gyroscope, strain gauge, displacement sensor, and accelerometer. On their own, such a suite of sensors can provide information about the operation (for example, location), dynamic behavior and health of the train. Simply knowing that the train is crossing a bridge based on GPS coordinates is insufficient to address the issue of the state of the bridge, e.g., how it is reacting to loads. Hence, a complete understanding of the behavior of the train including its vertical and lateral motions, among other train behavioral properties are needed to quantify how trains interact and load bridges, including how they dynamically couple with them. Without being able to fully understand the behavior of the train, the railway operator will not be able to realize all of the benefits noted.

At least one computing device located on the bridge and configured to receive signals from the sensors associated with the bridge, a computing device located on the train and configured to receive signals from the sensors associated with the train, and a separate computing device located on a network shared by computing device on the train and the computing device on the bridge can determine performance values for both the bridge and the train based on the responses of the sensors due to the interaction of the bridge and the train. For example, the computing device could implement a data-to-decision (D2D) framework that would empower railway operators to more accurately assess the condition of their bridges and to undertake quantitative risk-based bridge management methods. It is noted that all embodiments of the present disclosure do not require all three of the computing devices described above. The text in this paragraph is illustrative for one or more exemplary embodiments of the present disclosure.

In an embodiment, the data-to-decision framework would use algorithms for objective risk, reliability, and resilience assessment of individual bridges and regional rail networks that comprise a group of bridges. Given the fact that reliability assessment concerns itself with safety, risk assessment concerns itself with costs, and resilience assessment concerns itself with continuity in operations, the availability of these three metrics of performance for both single bridges and bridge networks would offer the decision maker an unprecedented opportunity to make cost-effective and safe decisions while maintaining the highest possible performance levels for a multitude of hazardous events.

Each of reliability, risk, and resilience assessments require a deep understanding of how a bridge responds under a dynamic load and such an understanding can only be obtained by having instrumented both the bridge and the train. For example, known system identification techniques can be used to estimate the dynamic properties of the train's suspension system by using static weight data combined with a priori known dynamic response behavior. The combination of the dynamic properties of the train's suspension system and data obtained from the sensors emplaced on the bridge can be used to calculate such factors as train axle loads, modal properties of the loaded bridge, dynamic load factors and other parameters related to the train-bridge interaction. By quantifying the dynamic loads imposed on the bridge from each train axle, the load and response behavior of the bridge both globally and locally (in other words at each bridge component and sub-component) can be determined. All of these factors provide the basis for reliability assessment calculations related to the bridge's structural health.

The reliability of bridge components can be combined to inform a reliability analysis of the entire bridge. When combined with the costs associated with surpassing defined limit states, the risk profile of a bridge can be created. Other factors that can be incorporated into the data-to-decision framework's algorithms include: bridge location, economic value of freight transported over the bridge, costs of delays and interruption of service, and costs of retrofits or replacements. Such factors can contribute to assessing the bridge and network risk.

By combining the data from the sensors installed in both the bridge and the train in a single monitoring framework, time-synchronized data streams can be processed in real-time or near real-time to determine the nature of the coupling and its impact on bridge structural elements. The same monitoring and control system may communicate directions to the train (such as speed) to minimize the load demand the train imposes on the bridge in order to minimize the consumed life of bridge structural components and to enhance the safety of the bridge.

In a non-limiting example, the stationary body 12 is a railroad bridge and the moving body 18 is a rail car. Displacement, strain, and acceleration sensors 16 are mounted on the railroad bridge 12 and GPS, load, and acceleration sensors 20 are mounted on the rail car 18. The displacement, strain, and acceleration sensors 16 can emit signals corresponding to changes in the static and dynamic conditions of the railroad bridge 12. The GPS, load, and acceleration sensors 20 can emit signals corresponding to a weight, speed, and changes in dynamic condition of the rail car 18 such as train dynamic train forces on the bridge. When the rail car 18 passes over the railroad bridge 12, the signals transmitted from the sensors 16, 20 over the wireless network 24 and are received by the computing device 22, which is located on the railroad bridge 12.

The signals received from the sensors 16, 20 can be assessed by the computing device 22. Either the signals themselves or computed values calculated based on these signals can be assessed based on predetermined values. For example, the computing device 22 of the monitoring and control system 10 can receive and monitor the signals received from the sensors 16 associated with the railroad bridge 12 over time, such as the passage of time represented cumulatively by the FIGS. 1-3. Each of the signals represents a condition of the railroad bridge 12 at a specific moment in time. The computing device 22 of the monitoring and control system 10 can compare at least one of the signals received from the sensors 16 associated with the railroad bridge 12 to either a particular predetermined set of values or a range of predetermined values. Alternatively, the computing device 22 of the monitoring and control system 10 can calculate one or more computed values using at least one of the signals received from the sensors 16 associated with the railroad bridge 12 and compare the calculated values to either a particular predetermined set of values or a range of predetermined values. The predetermined set of values and the range of predetermined values associated with the railroad bridge 12 and the sensors 16 are herein referenced as the "first" predetermined values and the "first" range of predetermined values.

The computing device 22 of the monitoring and control system 10 can also monitor signals received from the sensors 20 associated with the rail car 18 over time. Each of the signals represents a condition at a specific moment in time. The computing device 22 of the monitoring and control system 10 can compare at least one of the signals received from the sensors 20 associated with the rail car 18 to either a particular set of predetermined values or a range of predetermined values. Alternatively, the computing device 22 of the monitoring and control system 10 can calculate one or more computed values using at least one of the signals received from the sensors 20 associated with the rail car 18 and compare the calculated values to either a particular predetermined set of values or a range of predetermined values. The predetermined set of values and the range of predetermined values associated with the rail car 18 and the sensors 20 are herein referenced as the "second" predetermined values and the "second" range of predetermined values.

The computing device 22 of the monitoring and control system 10 can generate a first alert after comparing the signals received from the sensors 16 or the computed values calculated by computing device 22 to the first set of predetermined values or to the first range of predetermined values. The alert is generated in response to the signals or computed values being different than the first set of predetermined values or being outside of the first range of predetermined values. In the present non-limiting example, the signals received from the sensors 16 or the computed values calculated by computing device 22 can indicate that the railroad bridge 12 has not experienced changes in bridge loading and bridge condition under the conditions represented by FIGS. 1 and 3. Exemplary conditions that can be detected by sensors 16 and computing device 22 can include loading, excessive response (strain, displacement, acceleration), and damage (cracks, yielding). The sensors 16 are positioned at particular locations on the railroad bridge 12 and thus indicate the extent of changes in static or dynamic loading at that particular location. Alternatively, the signals received from the sensors 16 can indicate that the railroad bridge 12 is experiencing changes in static or dynamic loading, in particular under the conditions represented by FIG. 2. The computing device 22 can calculate appropriate computed values and compare any sensed changes in static and dynamic loading to a table stored in memory and/or assess the sensed changes with programmed logic to determine if the first alert should be emitted. For example, the computing device 22 can emit an alert in response to a displacement of greater than 0.5 inch at the particular location.

The computing device 22 of the monitoring and control system 10 can generate a second alert after comparing the signals received from the sensors 20 or the computed values calculated by computing device 22 to the second set of predetermined values or to the second range of predetermined values. The alert is generated in response to the values represented by the signals or computed values being different than the second predetermined set of values or being outside of the second range of predetermined values. In the present non-limiting example, the signals received from the sensors 20 or the computed values calculated by computing device 22 can indicate that the rail car 18 is not loaded. Alternatively, the signals received from the sensors 20 or the computed values calculated by computing device 22 can indicate that the rail car 18 is loaded to some amount or is overloaded. The computing device 22 can compare the sensed rail car load to a table stored in memory and/or assess the sensed load with programmed logic to determine if the second alert should be emitted. For example, the computing device 22 can emit an alert in response to a rail car load of greater than one hundred and thirty tons. It is again noted that the numerical values set forth herein are exemplary.

The computing device 22 of the monitoring and control system 10 can determine the performance value based on the signals received from the sensors 16 associated with the railroad bridge 12 and, the signals received from the sensors 20 associated with the rail car 18, and any computed values calculated by computing device 22. The performance value is determined by a function dependent on the values associated with the conditions sensed by the sensors 16 and 20 and calculated by the computing device 22. The function by which the performance value is determined can apply the values associated with the conditions sensed by the sensors 16 and 20 directly (sensed or measured conditions) or can apply quantities derived from the values, such as derivatives to any order and/or integrations.

In this first, non-limiting example disclosed thus far, the first alert can be emitted in response to the signals received from sensors 16 or the computed values calculated by computing device 22 indicating that the railroad bridge 12 is displaced greater than 0.5 inch and the second alert can be emitted in response to the signal received from the sensors 20 or the computed values calculated by computing device 22 indicating that the rail car 18 weighs greater than one hundred and thirty tons. In one exemplary set of operating conditions, a rail car 18 weighing thirty tons can traverse the railroad bridge 12 and the sensors 16 can sense a displacement 0.4 inch. Under these operating conditions, neither the first alert nor the second alert would be emitted.

The performance value can also be directed to the relationship between the displacement of the railroad bridge 18 and the weight of the rail car 18. Continuing the present example, it can be predetermined that an acceptable relationship between the displacement of the railroad bridge 18 and the weight of the rail car 18 is linear. In the present example, a linear relationship of the weight of the rail car 18, over the displacement of the railroad bridge 12 is 260.0 tons/inch:

$$\text{Performance Value} = (\text{Maximum weight, 130.0 tons}) / (\text{Maximum Displacement, 0.5 inch}).$$

In this example, the performance value is the slope of a line wherein weight is the dimension of a y-axis and displacement is the dimension of an x-axis. The performance value is thus a ratio of the change of the two respective values. In this example, every performance value equal to or greater than 260.0 tons/inch is acceptable.

The computing device 22 can determine the performance value at each clock cycle and/or as each discrete signal is received from the sensors 16 and 20. The computing device 22 of the monitoring and control system 10 can compare the performance value to a predetermined value or a range of predetermined values. The predetermined value and the range of predetermined values associated with the performance value are herein referenced as the "third" predetermined value and the "third" range of predetermined values.

The computing device 22 can generate the third alert after determining a present, performance value and despite also determining that neither the first alert nor the second alert are to be emitted. In the exemplary set of operating conditions, the rail car 18 weighs 30.0 tons and the displacement of the railroad bridge 12 is 0.4 inch. Under these operating conditions, neither the first alert nor the second alert would be emitted.

Continuing the present example, the computing device 22 can be configured to generate the third alert in response to determining that the performance value is less than 260.0 tons/inch. Under the exemplary set of operating conditions, the present performance value is 75.0 tons/inch. The performance value thus indicates that the railroad bridge 12 is being excessively displaced, despite the fact that the individual components of the system are within acceptable tolerances. The monitoring and control system 10 can also control the train (the moving body 18) to cross with the bridge in a manner that minimizes the impact that the train has on the bridge or the bridge has on the train. The computing device (mounted on either the train or the bridge) could receive a continuous flow of synchronous or asynchronous data from sensors on the bridge and on the rail car to process in real-time a command signal issued in real-time to the train car commanding the train car to travel at a specified speed. The real-time command can also command changes in the train car suspension system. The objective of the control action would be to minimize undesired responses of the bridge and/or train.

In another embodiment of the present invention, the stationary body is a stamping press and the moving body is a piece of sheet metal that is being formed by said stamping press. Metal stamping operations are ubiquitous across a wide variety of industries, ranging from home appliances to automobiles to aircraft. In certain industries, in particular those that employ just-in-time manufacturing practices, the amount of work-in-process (WIP) inventory is kept to a minimum. Thus, a failure of the manufacturing system can result in significant financial losses for the producer since certain failures can starve the entire manufacturing system of critically needed parts. Since stamping lines are major capital assets, often costing tens of millions of dollars, it is often the case that there is no stamping capacity redundancy, thus the lines represent a single point of failure.

This is particularly problematic for manufacturers since stamping is a highly energetic process, one that subjects the stamping machinery to extreme loads in environments whose ambient conditions can vary widely over time. Further complicating matters is the need for the parts produced to meet very tight tolerances in the face of changing ambient conditions, tool wear, etc.

Improving operational efficiency means minimizing downtime, both planned and unplanned, while ensuring part quality. A system that provides plant managers with predictions of machinery health and a real-time assessment of part quality allows them to efficiently deploy resources, on an as-needed basis, to keep machinery operating, effectively, accurately, and safely. Such a system is an embodiment of the present disclosure.

Under such a system, maintenance strategies can be based on monitored performance rather than a fixed-schedule in order to reduce the cost of performing maintenance. Current best practices for maintenance are based on fixed schedules derived from historical data. Thus, maintenance is typically performed more often than necessary to minimize the risk of catastrophic failure. However, since the actual health of the machinery is not known, catastrophic failures do occur.

In stamping production environments of such a system, only a very small percentage of parts are inspected for quality purposes. Typically, the part is placed into a fixture to ensure that certain critical dimensions fall within allowable tolerance bounds. The problems with this approach include: when a bad part is found, it is not known how many parts since the prior inspection are bad; and the current methods do not provide any means for determining if a failure may occur in the future.

The present invention provides such a system. The stamping press may be outfitted with a suite of sensors, possibly including one or more of current clamps, strain gauges, accelerometers, displacement sensors, pressure/force gauges, and thermocouples. On their own, such a suite of sensors can provide information about the health of the press, but there is no way to determine with certainty if the press is actually stamping a part when the sensors are interrogated. For example, current clamps can determine if excessive energy is being supplied to a motor and strain gauge could assess the actual load being applied to a mold. However, without knowing if a part is actually being formed, and more importantly, if the part is being formed properly, this set of sensors may not always predict the actual health of the press or the quality of the parts being produced. Without being able to make such predictions, the press operator will not be able to realize all of the benefits noted.

The sheet metal blank may be outfitted with a suite of sensors, including one or more of strain gauges, current clamps, accelerometers, temperature sensors, etc. To control costs, one could use either modern printing methods to print the sensor and transceiver onto the blank or extremely low-cost sensors that can be rapidly stuck onto the part, thereby minimally impacting cost. Sensors can sense part temperatures, strains, and vibrations. Such sensors could be active with a power source and wireless interface or passive without a power source but powered and readable through wireless means such as RFID, inductive coupling, or wireless backscatter means. On their own, such a suite of sensors can provide information about the current status of the part and whether the part is being actively formed could be inferred by examining the rate of change of the sensed value. However, without also knowing what is happening to the machine while the part is being formed, the machine operator will not be able to realize all of the benefits noted.

Consider the forming of a bend in a sheet metal part. With a properly designed, new mold and a properly calibrated press, the part will deform at some rate and the metal thickness through the bend area will be consistent. Further, the load being applied by the machine will generally increase in a relatively smooth manner. By gathering data from both the machine and the part, this proper operation of the press, yielding properly formed parts, can be verified.

The sensors on the moving part being worked on by the manufacturing process can communicate directly with the sensors on the machine, as disclosed in the first exemplary embodiment of the present disclosure. In one or more embodiments of the present disclosure, the at least one computing device is mounted on the same physical structure as one of the sensors and the network is a sensor network. U.S. Pat. No. 9,848,280 discloses such a sensor node and is hereby incorporated in its entirety. Using sensed data, the quality of the manufacturing process can be assessed. In a stamping process a quality measure may include, for example, a quantitative measure of the part deformation per press strike or part movement during the press strike. Using a measure of the manufacturing effectiveness, the press may autonomously adjust stamping parameters to maximize part quality and press efficiency while minimizing consumed equipment life.

As the tooling wears, or if lubrication is improperly applied to the part before it is formed, the forming operation will no longer be smooth. The forming of the bend feature will not deform at a uniform rate—it is likely that there will be period of slow deformation followed by periods of rapid deformation. Sensors on the part will detect this lack of uniformity, which, if left unchecked, would lead to non-uniform metal thickness through the bend area. The sensors on the press will detect non-smooth changes in the force being applied. By gathering data from both the machine and the part, this improper operation of the press, which can lead to improperly formed parts, can be detected before bad parts are formed.

The detecting of these abnormal signals can provide the machine operators with the ability to schedule machine maintenance during normally scheduled downtime, thereby both reducing the need to perform maintenance more often than necessary and reducing the likelihood that part and/or machine failures will result in unplanned downtime.

Figure 4:
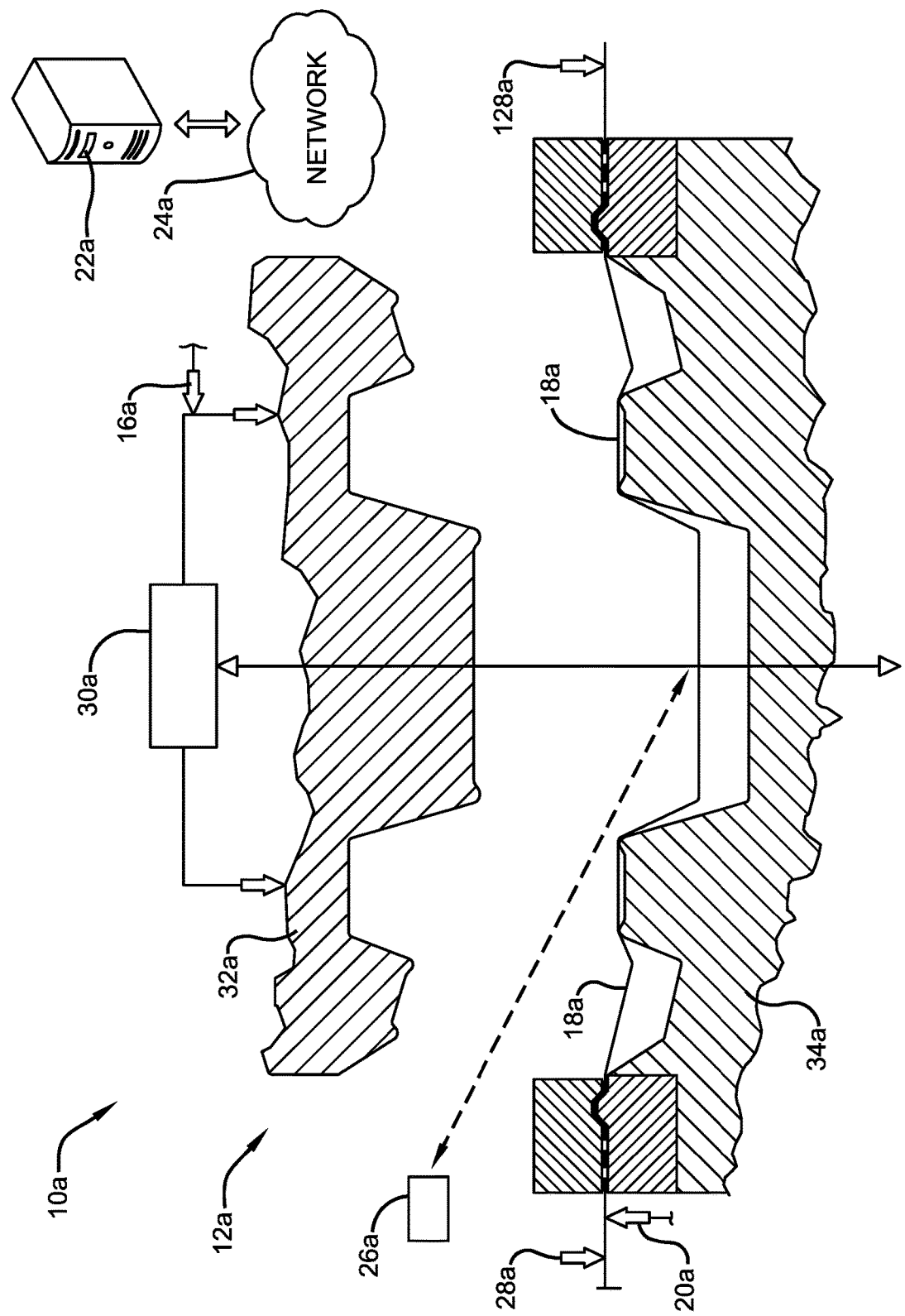
FIG. 4 is a schematic cross-section of another exemplary embodiment of the present disclosure.

FIG. 4 discloses another non-limiting example. A stationary body 12a of a monitoring and control system 10a is a stamping press and a moving body 18a is a workpiece acted upon by the stamping press 12a. The workpiece 18a is moved along a path onto the stamping process 12a, subjected to a stamping operation, and removed after the stamping operation. Based on the perspective of FIG. 4, the path could extend from the right to the left, vice-versa, into the page, or out of the page. The manufacturing arrangement can involve directing current through the workpiece 18a to heat the workpiece 18a prior to the stamping operation. Electrodes for directing current through the workpiece 18a are referenced at 28a and 128a. The current can be pulsed. The stamping press 12a includes a power source 30a to drive a moveable drive shoe 32a against a fixed die shoe 34a. A force sensor 16a is mounted on the stamping press 12a and a current clamp 20a is mounted on the workpiece 18a. The force sensor 16a can emit signals corresponding to an amount of force exerted by the stamping press 12a on the workpiece 18a. The current clamp 20a can emit signals corresponding to the amount of current passing through the workpiece 18a. An additional temperature sensor 26a (such as a remotely-positioned infrared sensor) can be arranged to detect the temperature of the workpiece 18a, whereby the current passing through the workpiece 18a can be adjusted to achieve a desired, predetermined temperature. When the workpiece 18a is positioned on the stamping press 12a, the signals are transmitted from the sensors 16a, 20a over a network 24a and are received by at least one computing device 22a.

In the present example, using exemplary numerical values, a first alert can be emitted if the sensed force is outside the range of twenty to twenty-five tons. A second alert can be emitted if the current is outside of the range of 2700-3000 A. An exemplary performance value can be the product of the tonnage and the current (tonnage multiplied by current). For example, high current and high tonnage can indicate deficiencies in the microscopic structure of the workpiece 18a. Relatively high current can be required to heat the workpiece if the electrical resistance inherent in the workpiece 18a is higher than expected. This can indicate that the material properties of the workpiece 18a are different than expected. Similarly, relatively high tonnage can indicate that the material properties of the workpiece 18a are different than expected since the workpiece 18a would not deform as expected based on the delivered tonnage. High current as well as high tonnage can strongly indicate a problem inherent in the workpiece 18a. The at least one computing device 22a can emit the third alert in response to the performance value being greater than 61.6 E+3 Amp-tons. This exemplary performance value corresponds to 2800 amps multiplied by twenty-two tons. It is noted that neither 2800 amps nor twenty-two tons would prompt the second or first alerts, respectively.

It is noted that the computing device 22a can be configured to implement a data-to-decision (D2D) framework that would assist in not only maintenance, but can also be expanded into other areas of production such as inventory management.

In another embodiment of the present invention, the stationary body is a structural support for a conveyor platform in an automated assembly line, and the moving body is a carrier sled or cart that conveys a manufactured assembly from station to station along the assembly line for the purpose of modular assembly work.

Automated assembly lines are a core component to many heavy manufacturing processes. These lines convey a semi-finished assembly from station to station, where parts are added or modified in sequence until the final assembly is complete. By automating both the movement of an assembly and the tasks taking place as the assembly moves from station to station, a finished assembly can be created faster and with less labor than is possible when using manual laborers.

In certain industries that employ just-in-time manufacturing processes, such as the automotive industry, assembly lines often run close to 24/7 in order to keep up with demand. Thus, a failure of an assembly line can result in significant financial losses for the producer since certain failures can starve the entire manufacturing system of critically needed assemblies. Additionally, since assembly lines are major capital assets, often costing tens of millions of dollars, it is often the case that there is no assembly redundancy, thus lines represent a single point of failure for a system that might generate tens of thousands of dollars per minute in revenue for a manufacturer.

Degradation in an assembly line is often caused by out-of-specification interaction between a conveyor platform and the sled or cart that it is conveying. Because there are often a large number of sleds being used on a single conveyor, a problem with any single sled or cart can lead to improper operating conditions and the gradual degradation of the entire assembly line. As such, a system that can detect anomalous line behavior could allow for poorly functioning sleds or carts to be quickly removed from the line and repaired, eliminating the need for downtime and helping the assembly line to operate effectively, accurately, and safely.

The present invention provides such a system. The structural support for an assembly conveyor platform may be outfitted with a suite of sensors, possibly including one or more of current clamps, strain gauges, accelerometers, pressure transducers, and thermometers. On their own, such a suite of sensors can provide information about the health of the gears, motors, and bearings using by the conveyor, as well as the structural behavior and integrity of the conveyor platform and support. However, without knowing which, if any, cart or sled is being conveyed at the time of an anomalous sensor reading, it may be impossible to determine if the problem is due to a single poorly performing sled that could be easily replaced or repaired without the need for any system downtime.

Similarly, the carrier cart or sled may be outfitted with a suite of sensors, possibly including one or more of a strain gauge, gyroscope, thermometer, accelerometer, etc. On their own, such a suite of sensors can provide information about the operation, dynamic behavior, and health of the cart or sled. However, simply knowing that a cart or sled has been damaged is not enough to know whether an assembly line itself is at risk for damage or unplanned downtime.

Consider a situation where a cart or sled was bent or otherwise damaged when being removed from the end of an assembly line and returned to the beginning to convey another assembly. It is possible that this deformed cart could interact with the conveyer platform repeatedly over time in such a way as to cause a bearing failure that would require the line to be unexpectedly shut down for repairs. Deploying a sensing system on just the cart or sled may allow the deformation to be detected, but there would be no way to know whether the deformation would have any negative impact on the conveyor. Similarly, deploying a sensing system on just the conveyer platform may allow the degradation of the bearing to be detected, but there would be no way to know which cart, if any, was causing the degradation. However, by monitoring both cart and conveyer, the cart degradation could be detected and tied directly to the onset of degradation in the conveyer, and the cart could be immediately replaced or repaired without requiring any unplanned downtime.

Figure 5:
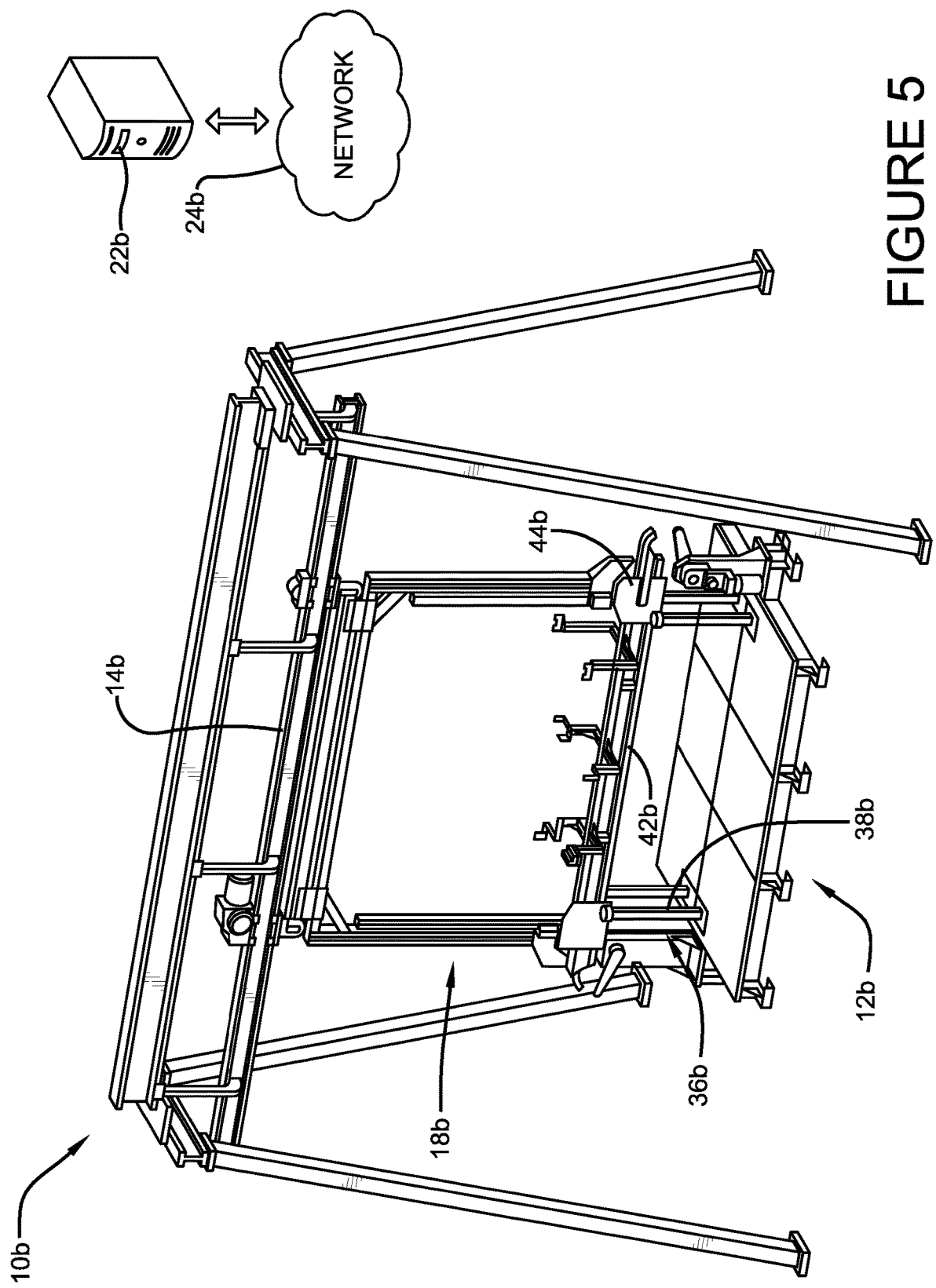
FIG. 5 is a partially schematic, partially perspective view of another exemplary embodiment of the present disclosure.
Figure 6:
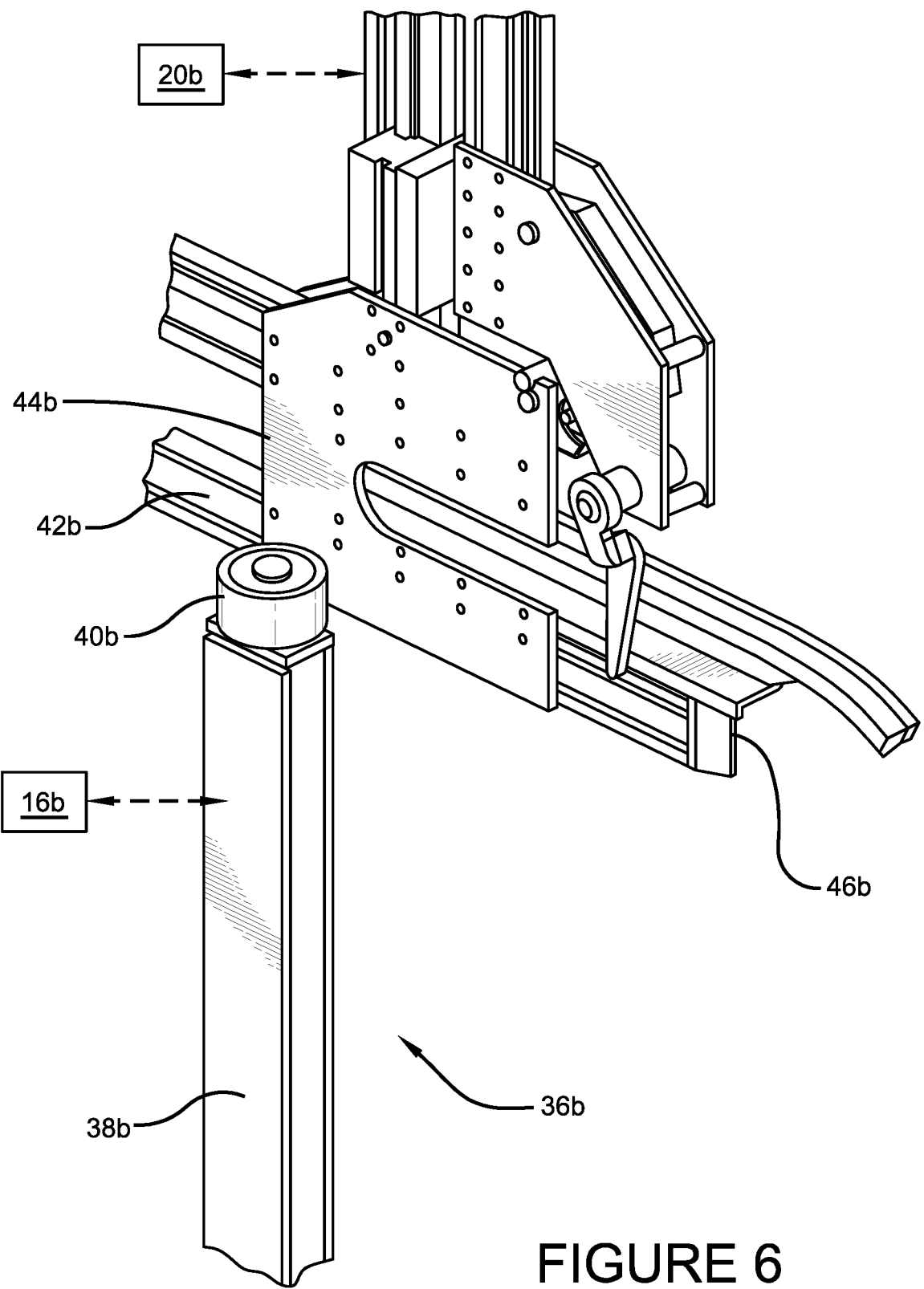
FIG. 6 is a magnified view of a portion of the structures shown in FIG. 5.

FIGS. 5 and 6 disclose another non-limiting example of the present disclosure. A stationary body 12b of a monitoring and control system 10b is a workstation positioned along a production line and a moving body 18b is a workpiece carrier that temporarily stops at the workstation 12b and is then again moved along the production line. The production line defines a path 14b formed by an overhead rail. Workers or robots (not shown) can be positioned at the workstation 12b to execute a manufacturing operation when the carrier 18b is positioned at the workstation 12b. The manufacturing operation can be performed on a workpiece (not shown) resting on the carrier 18b.

The exemplary workstation 12b includes guide assemblies, such as guide assembly 36b. As best shown in FIG. 6, the exemplary guide assembly 36b includes a post 38b and a roller 40b. As best shown in FIG. 5, the exemplary workstation 12b includes four guide assemblies, a first opposing pair at the upstream end of the workstation 12b and a second opposing pair at the downstream end of the workstation 12b. The exemplary guide assembly 36b is positioned at the upstream end of the workstation 12b.

The carrier 18b includes a plurality of structural members, two of such members referenced at 42b and 44b. When the carrier 18b enters the workstation 12b, a leading edge 46b of the structural member 42b may pass between the rollers of the guide assemblies. However, if the carrier 18b has been damaged and is deformed, the leading edge 46b may collide with the roller 40b (or the roller on the opposing guide assembly). The roller 40b guides the deformed carrier 18b into a desired position at the workstation 12b to ensure accuracy in the manufacturing operation to be performed at the workstation 12b. However, the impact between the carrier 18b and the roller 40b can damage the guide assembly 36b or accelerate a timeline for maintenance of the guide assembly 36b.

An impact sensor 16b is mounted on the guide assembly 36b and an accelerometer 20b is mounted on the carrier 18b. The impact sensor 16b can emit signals corresponding to an amount of force exerted by the carrier 18b on the guide assembly 36b of the workstation 12b. The accelerometer 20b can emit signals corresponding to the movement of the carrier 18b as the carrier engages the roller 40b. Signals are transmitted from the sensors 16b, 20b over a network 24b and are received by at least one computing device 22b, which is located on workstation 12b.

In the present example, a first alert can be emitted if the sensed impact on the guide assembly 36b is greater than ten Newtons. A second alert can be emitted if the acceleration of the carrier 18b is greater than five meters per second squared. A performance value can be the sum of the numeric values of impact and the acceleration, without regard to the difference in the natures of the measured properties. For example, high impact and high acceleration can indicate significant deformation of the carrier 18b. The at least one computing device 22b can emit the third alert in response to the performance value being greater than twelve, for example. This exemplary performance value corresponds to the addition of eight (Newtons) and four (meters per second squared). It is noted that neither eight Newtons nor four meters per second squared would prompt the first or second alerts, respectively. The monitoring and control system 10b can also control the carrier 18b to enter the workstation 12b in a manner that minimizes the impact that the carrier 18b has on the workstation 12b or the workstation 12b on the carrier 18b. The at least one computing device 22b could receive a continues flow of synchronous or asynchronous data from sensors on the guide assembly and on the carrier to process in real-time a command signal issued in real-time to the production line commanding the carrier to travel at a specified speed. The objective of the control action would be to minimize undesired responses of the carrier and/or the guide assembly.

While the present disclosure has been described with reference to various exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any of the particular, exemplary embodiments disclosed as the best mode contemplated for carrying out this present disclosure, but that the present disclosure will include all embodiments falling within the scope of the appended claims. More than one "invention" may be disclosed in the present disclosure; an "invention" is defined strictly by the content of a patent claim and not by what is written in a detailed description of an embodiment of an invention. The right to claim elements and/or sub-combinations that are disclosed herein as other present disclosures in other patent documents is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed.

What is claimed is:

1. A monitoring and control system comprising:
   a stationary body positioned along a path of movement;
   at least one sensor associated with said stationary body and configured to emit signals corresponding to a condition of said stationary body;
   a moving body that moves along the path of movement and physically interacts with said stationary body during movement along the path of movement;
   at least one sensor associated with said moving body and configured to emit signals corresponding to a condition of said moving body;
   at least one computing device, having one or more processors and located either on said stationary body or on said moving body or remotely, configured to receive and process signals from said at least one sensor associated with said stationary body and to receive and possibly process signals from said at least one sensor associated with said moving body;

wherein said at least one computing device is also configured to determine a performance value of at least one of said stationary body and said moving body based on the physical interaction between said moving and stationary bodies as said moving body traverses said stationary body during travel along the path of movement;

wherein said performance value is dependent on both of the signals received from the at least one sensor associated with the stationary body and the signals received from the at least one sensor associated with the moving body during the period that the moving body physically interacts with the stationary body;

wherein said at least one computing device is further defined as configured to:

monitor and possibly process signals received from said at least one sensor associated with said stationary body over time;

comparing at least one of the signals received from said at least one sensor associated with said stationary body to one of a first set of predetermined values and a first range of predetermined values;

monitor and possibly process signals received from said at least one sensor associated with said moving body over time;

comparing at least one of the signals received from said at least one sensor associated with said moving body to one of a second set of predetermined values and a second range of predetermined values;

generating a first alert after said comparing the at least one of the signals received from said at least one sensor associated with said stationary body to the one of the first set of predetermined values and the first range of predetermined values, said generating in response to the at least one of the signals received from said at least one sensor associated with said stationary body being one of different than the first set of predetermined values and outside of the first range of predetermined values;

generating a second alert after said comparing the at least one of the signals received from said at least one sensor associated with said moving body to the one of the second set of predetermined values and the second range of predetermined values, said generating the second alert in response to the at least one of the signals received from said at least one sensor associated with said moving body being one of different than the second set of predetermined values and outside of the second range of predetermined values;

determining the performance value based on both of the at least one of the signals received from said at least one sensor associated with said stationary body and at least one of the signals received from said at least one sensor associated with said moving body;

comparing the performance value to one of a third set of predetermined values and a third range of predetermined values; and generating a third alert after said determining and (1) after said comparing the at least one of the signals received from said at least one sensor associated with said stationary body to the one of the first set of predetermined values and the first range of predetermined values and the at least one of the signals received from said at least one sensor associated with said stationary body being one of the same as the first set of predetermined values and inside of the first range of predetermined values, (2) after said comparing the at least one of the signals received from said at least one sensor associated with said moving body to the one of the second set of predetermined values and the second range of predetermined values and the at least one of the signals received from said at least one sensor associated with said moving body being one of the same as the second set of predetermined values and inside of the second range of predetermined values, and (3) the performance value being one of different than the third set of predetermined values and outside of the third range of predetermined values.

2. The monitoring and control system of claim 1 wherein:
said stationary body is further defined as a bridge; and
said moving body is further defined as a vehicle traversing said bridge.

3. The monitoring and control system of claim 1 wherein:
said stationary body is further defined as a stamping die; and
said moving body is further defined as a workpiece received in said stamping die.

4. The monitoring and control system of claim 1 wherein:
said stationary body is further defined as a workstation positioned along a production line; and
said moving body is further defined as a workpiece carrier moved along the production line.

5. The monitoring and control system of claim 1 wherein:
said at least one sensor associated with said stationary body is further defined as a displacement sensor; and
said at least one sensor associated with said moving body is further defined as a strain gauge.

6. The monitoring and control system of claim 1 wherein:
said at least one sensor associated with said stationary body is further defined as a force sensor; and
said at least one sensor associated with said moving body is further defined as a current clamp.

7. The monitoring and control system of claim 1 wherein:
said at least one sensor associated with said stationary body is further defined as an impact sensor; and
said at least one sensor associated with said moving body is further defined as an accelerometer.

8. The monitoring and control system of claim 1 wherein said performance value is further defined as a ratio of changes of values respectively represented by the signals from said at least one sensor associated with said stationary body and the signals from said at least one sensor associated with said moving body.

9. The monitoring and control system of claim 1 wherein said performance value is further defined as a product of values respectively represented by the signals from said at least one sensor associated with said stationary body and the signals from said at least one sensor associated with said moving body.

10. The monitoring and control system of claim 1 wherein said performance value is further defined as a sum of values respectively represented by the signals from said at least one sensor associated with said stationary body and the signals from said at least one sensor associated with said moving body.

11. The monitoring and control system of claim 1 wherein:
said stationary body is further defined as a bridge;

said moving body is further defined as a vehicle traversing said bridge;
said at least one sensor associated with said stationary body is further defined as a displacement sensor;
said at least one sensor associated with said moving body is further defined as a strain gauge; and
said performance value is further defined as a ratio of changes of values respectively represented by the signals from said at least one sensor associated with said stationary body and the signals from said at least one sensor associated with said moving body.

12. The monitoring and control system of claim 1 wherein:
said stationary body is further defined as a stamping press;
said moving body is further defined as a workpiece received in said stamping press;
said at least one sensor associated with said stationary body is further defined as force sensor;
said at least one sensor associated with said moving body is further defined as current clamp; and
said performance value is further defined as a product of values respectively represented by the signals from said at least one sensor associated with said stationary body and the signals from said at least one sensor associated with said moving body.

13. The monitoring and control system of claim 1 wherein:
said stationary body is further defined as a workstation positioned along a production line;
said moving body is further defined as a workpiece carrier moved along the production line
said at least one sensor associated with said stationary body is further defined as an impact sensor;
said at least one sensor associated with said moving body is further defined as an accelerometer; and
said performance value is further defined as a sum of values respectively represented by the signals from said at least one sensor associated with said stationary body and the signals from said at least one sensor associated with said moving body.

14. The monitoring and control system of claim 1 wherein the at least one computing device is further defined as configured to execute feedback control to either of said moving body, said stationary body, or interactions of said moving and stationary bodies, said feedback control based on both of the at least one of the signals received from said at least one sensor associated with said stationary body and at least one of the signals received from said at least one sensor associated with said moving body.

* * * * *